United States Patent
Barabas

(10) Patent No.: US 9,649,783 B2
(45) Date of Patent: May 16, 2017

(54) METHOD FOR PRODUCING PAVER BLOCK HAVING MOTTLED TREAD SURFACE

(71) Applicant: Arpad Barabas, Veszprem (HU)

(72) Inventor: Arpad Barabas, Veszprem (HU)

(*) Notice: Subject to any disclaimer, the term of this patent is extended or adjusted under 35 U.S.C. 154(b) by 356 days.

(21) Appl. No.: 14/284,633

(22) Filed: May 22, 2014

(65) Prior Publication Data

US 2015/0239155 A1  Aug. 27, 2015

(30) Foreign Application Priority Data

Feb. 25, 2014  (HU) .................................... 1400101

(51) Int. Cl.
  *B29C 31/06* (2006.01)
  *B28B 13/02* (2006.01)
  *B29L 31/10* (2006.01)

(52) U.S. Cl.
  CPC ............ *B29C 31/06* (2013.01); *B28B 13/022* (2013.01); *B28B 13/023* (2013.01); *B28B 13/029* (2013.01); *B29L 2031/102* (2013.01)

(58) Field of Classification Search
  None
  See application file for complete search history.

(56) References Cited

U.S. PATENT DOCUMENTS

| | | | | |
|---|---|---|---|---|
| 633,313 A * | 9/1899 | Hains | ...................... | B01F 5/246 366/9 |
| 2,280,488 A * | 4/1942 | Jenkins | ................... | B28B 1/005 264/113 |
| 3,383,442 A * | 5/1968 | Mountain | ................ | B05D 1/38 156/297 |
| 4,094,941 A * | 6/1978 | Manners | .................... | B28B 1/16 264/256 |
| 4,207,009 A * | 6/1980 | Glocker | .................. | B01F 5/246 366/337 |
| 5,248,338 A | 9/1993 | Price | | |
| 6,382,947 B1 * | 5/2002 | Bryant | .................... | B01F 5/265 425/130 |
| 6,461,552 B1 * | 10/2002 | Geiger | ................ | B28B 13/0215 264/245 |

(Continued)

FOREIGN PATENT DOCUMENTS

EP  1431014  6/2004
EP  1510314  3/2005

(Continued)

*Primary Examiner* — Edmund Lee
(74) *Attorney, Agent, or Firm* — Dowell & Dowell, PC

(57) ABSTRACT

A method and apparatus for producing paving blocks having ornamented surface, and the apparatus includes a starting table, a filling carriage movable along a guide rail towards and above a forming having at least one mold cavity, and connected to the starting table is arranged, and in an interior space of the filling carriage a first chamber for receiving base material, and at least one second chamber for receiving ornamenting material are formed and separated by a septum, and a feeding device, for dispensing a mixture of ornamenting material is arranged in the second chamber and wherein the feeding device is formed by a metering plate provided with holes and a metering member fitted to and movable along the metering plate and further provided by an actuator for moving the metering member.

10 Claims, 14 Drawing Sheets

(56) References Cited

U.S. PATENT DOCUMENTS 7,819,607 B2 * 10/2010 Carreras-Maldonado   B28B 3/021
                                                    249/139
7,935,284 B2 *  5/2011 Metten .................... B28B 1/005
                                                    264/113

FOREIGN PATENT DOCUMENTS

| EP | 1827784 |   | 7/2012 |
| JP |  091517 | * | 1/1997 |

* cited by examiner

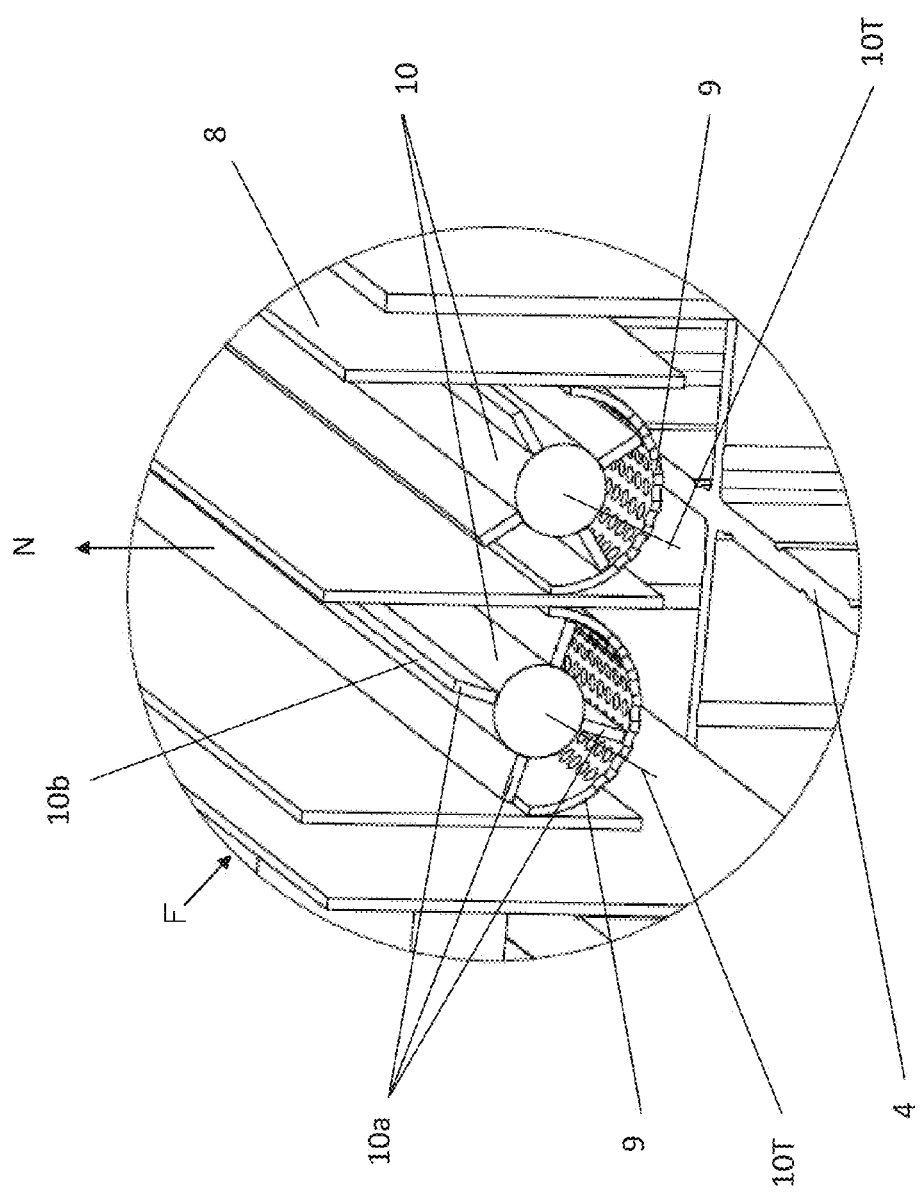

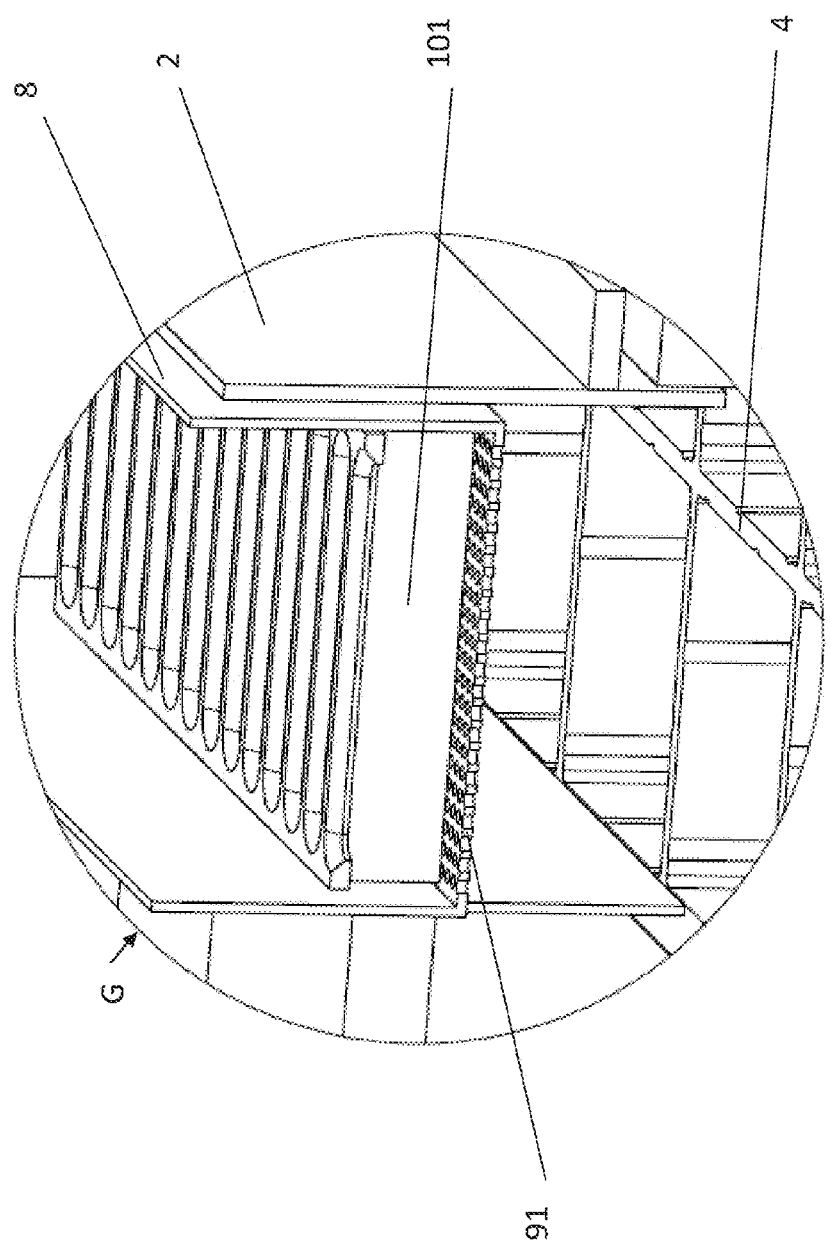

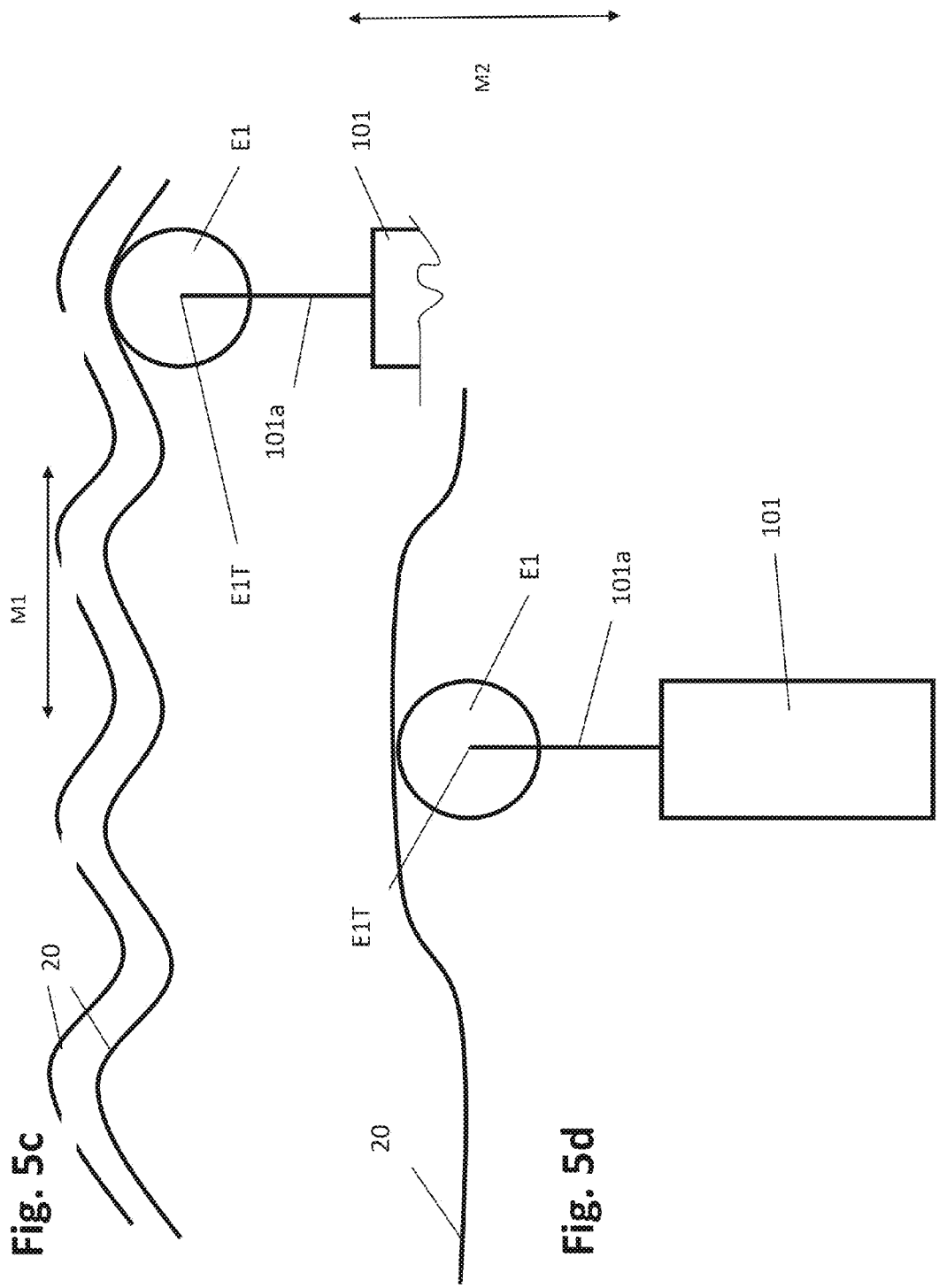

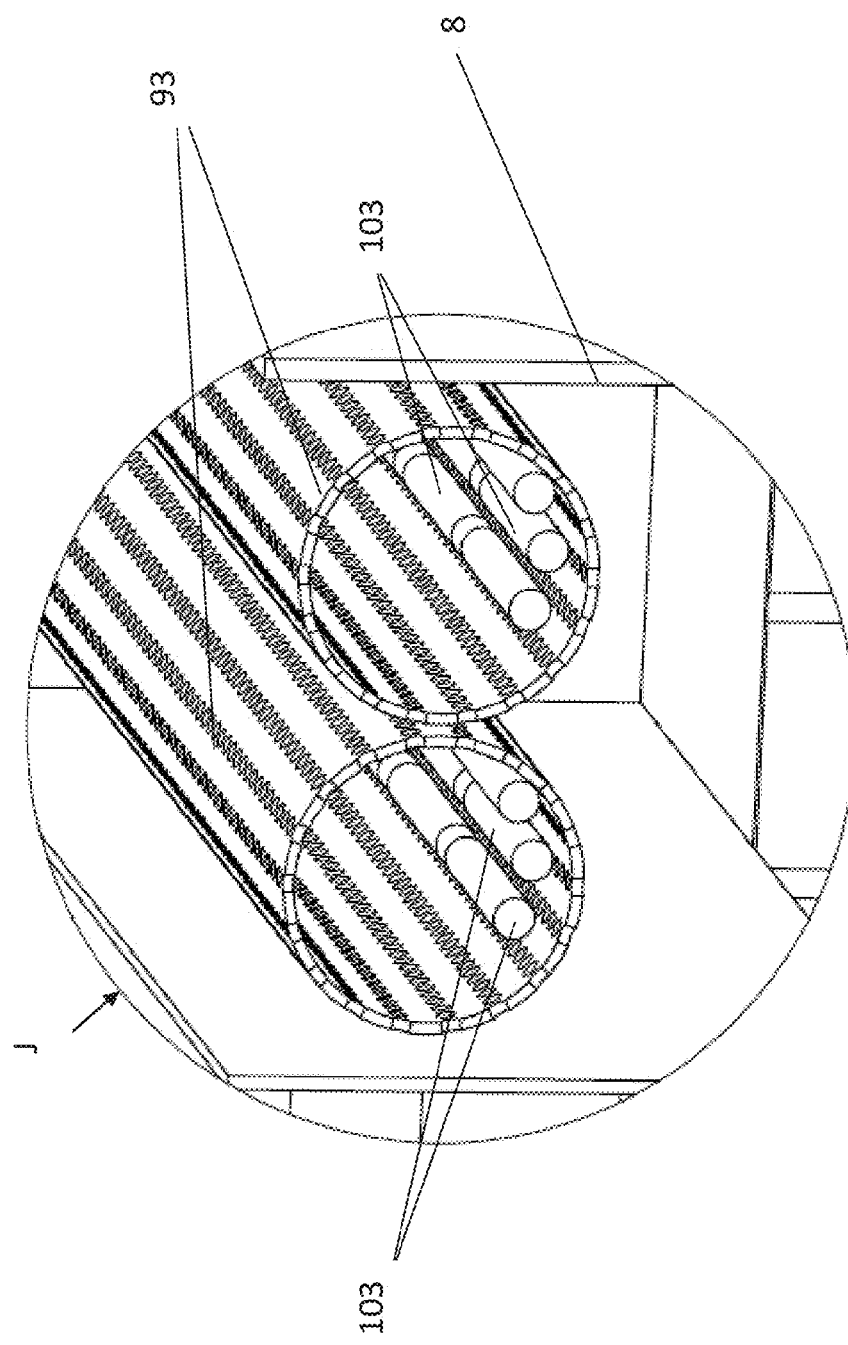

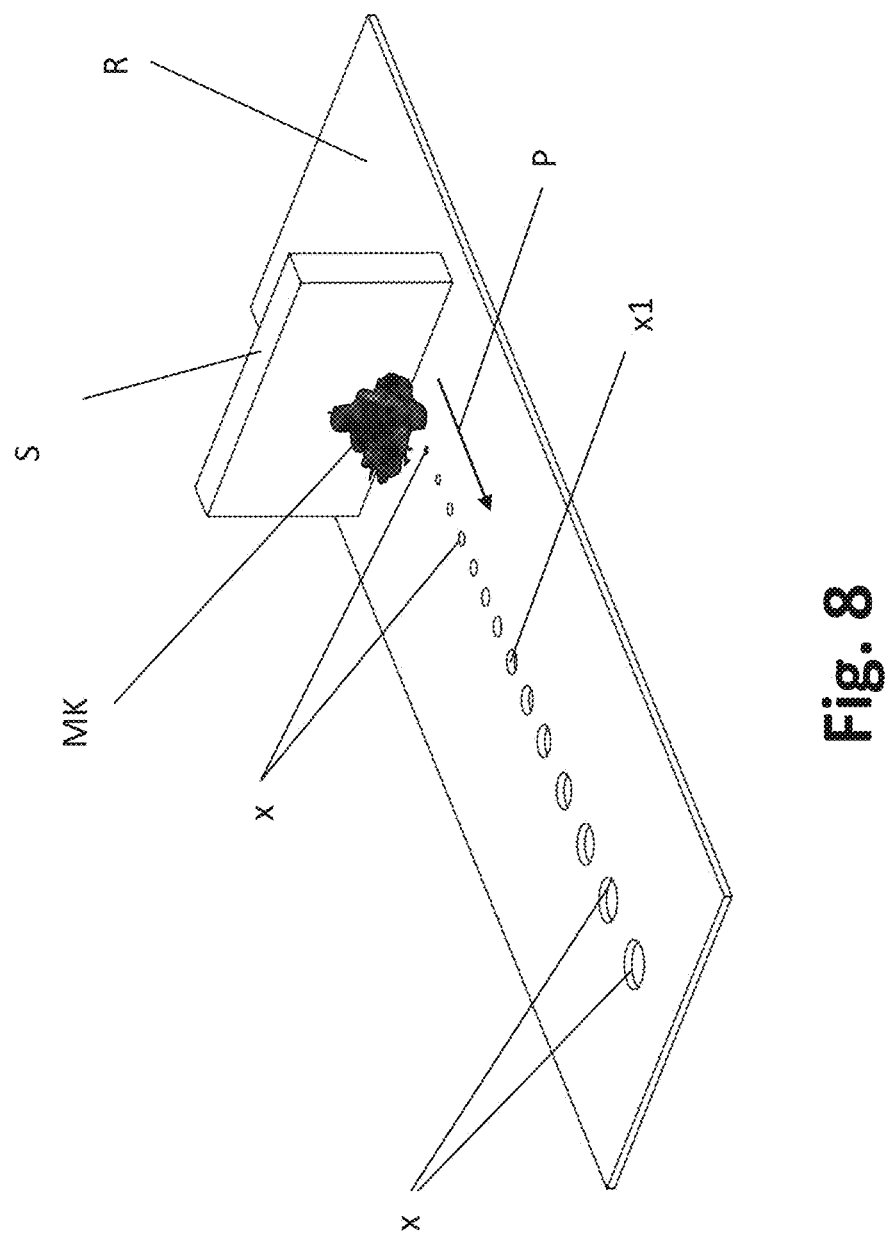

METHOD FOR PRODUCING PAVER BLOCK HAVING MOTTLED TREAD SURFACE

This invention relates to an apparatus for producing paving blocks having ornamented or mottled surface, consisting of a starting table, and a filling carriage movable along a guide rail towards and above a forming mould comprising at least one mould cavity and connected to the starting table is arranged; and in an interior space of the filling carriage a first chamber for receiving base material and at least one second chamber for receiving ornamenting material are formed and separated by a septum, and a feeding device for dispensing a mixture of ornamenting material is arranged in said second chamber, and a method for producing paving blocks having ornamented surface, comprising the steps of filling a base material into a mould cavity of a forming mould, making a mixture of ornamenting material of at least a granular material and a binder, the mixture having an average grain size corresponding to the average grain size of the planned ornament to be formed on the tread surface of the paver, and having a tint different from that of the base material, and applying the mixture of ornamenting material into the surface of the base material filled into the cavity.

The pavers or paving blocks have become indispensable with a variety of artificial surfaces, patios, walkways, garden paths, even with making roads to be used by vehicle traffic by covering the road surface with pre-manufactured and juxtaposed pavers being generally similar in size to the size of conventional bricks and usually made of concrete, rather than subsequently solidified material, for example poured concrete or asphalt. Since paver blocks can be made in varied shape and surface quality, they are particularly suitable for forming aesthetic walking surfaces, that is the need for paving blocks made firstly of concrete having appealing surface continues to grow. The vast majority of concrete paver blocks having an eye-catching surface differ from the rectangular concrete-gray pavers by the color of the surface and/or the shape of the block, and their color is usually obtained by using a concrete base material mixed with a coloring agent. Although it is possible to achieve an aesthetic effect by juxtaposing paving blocks provided even by differently colored surfaces, a more pronounced demand is emerging for paving blocks having a patterned tread surface especially those resembling natural rock surfaces. Such rocks are e.g marble, granite or diorite. Therefore, colored paving blocks have been developed, the concrete base material of which contains additive grains with diversified shape and different in color from those of the concrete, consequently the tread surface of the paver becomes grainy, requiring washing, grinding, wearing or other surface processing. However, a serious drawback of this solution is that the production of such a paver element is much more expensive than even the base-material-colored paving blocks, because the additives being more expensive than the base material must be dispersed of the total volume of the base material, let alone expensive reworking.

This problem is seeking to remedy by a method disclosed in publication EP 1 827 784 B1, in which concrete elements are formed, so that concrete is poured into molds, wherein the surfaces of the molded concrete element have one or more basic color, then grained surface forming mixture is thrown onto the surface by shot or blowing. The shooter or thrower dispensing the mixture are centrifugal feeder disc, impeller, shooting arm, spring-loaded metering piston, air nozzle operated by compressed air or a dosing vessel fitted with metering belt moved during the process over or along the mould by constant or variable speed. The drawback of the solution is that the particulate material mixture is applied to the surface of the concrete block by the apparatus, such that the distribution of the mixture in the surface cannot be controlled, because the material particles leave the apparatus at high speed in a dispersion cone flying toward the surface of the concrete member along the arc of oblique projection, forming an initially flat angle of the concrete block's surface, and their impact position is determined by their initial speed and the angle of trajectory followed within the dispersion cone, the factors, which cannot be planned in advance. Further, since the distribution of the material particles within the dispersion cone is not even as well, the document recommends use of baffle plates to avoid scattering loss and accumulation of particles in the same places, which in turn further spoils the spray pattern, because material particles falling down from baffle plates accumulate on the surface of the concrete member.

To eliminate these disadvantages a method for preparation of multi-color concrete pavers is disclosed by publication document EP 1510314 B1, the method comprises filling a colored concrete mortar into the first receiving space of a filling carriage from a silo, the filling carriage is moved over a mold for producing concrete blocks, and the mold is filled with concrete mortar from the filling carriage, and then the filling carriage is pushed back, and concrete mortar in the mold is compressed. Filling differently colored concrete mortar into the second receiving space of the filling carriage, transversing the filling carriage across the moulding tool for the concrete blocks; filling the moulding tool with concrete mortar from the filling carriage under introducing the concrete mortar from the second receiving space onto the concrete mortar of the first receiving space by means of at least one distributing roller rotationally driven in accordance with a predetermined discharge and extending transversely to the displacement stroke of the filling carriage; returning the filling carriage; and compacting the concrete mortar located in the moulding tool. An apparatus is also disclosed by this document for producing multicolored concrete blocks comprising: a silo, moulding tool for the concrete blocks and a filling carriage which is open at the bottom and displaceable over a table top between a position under the silo and a position above the moulding tool, wherein the silo is subdivided into at least two receiving spaces for concrete mortar transversely to the displacement stroke of the filling carriage by at least one partition wall, each of said receiving spaces being provided with an underside closable outlet, and wherein the filling carriage is subdivided transversely to its displacement stroke into a corresponding number of correspondingly arranged receiving spaces, which are open at the bottom and of which at least one is provided with a drivable distributing roller extending transversely to the displacement stroke of the filling carriage. This solution, however, cannot eliminate completely the disadvantages of the invention disclosed in EP publication EP 1827784 B1, because the driven distributor roller is a substantially projectile structure, too, which lets fly the same amount of colored concrete mortar onto the surface of concrete in the mold along its full length, so the pattern thus formed, regardless rotation speed and direction of rotation of the distributing roller, has theoretically almost identical nature, with uniformly distributed surface granularity and appears as a structure comprising spots of uniform granularity and grainless spots.

It is evident that surface pattern of concrete paving blocks can be planned by none of these solutions according to the prior art, because the distribution of the material mixture on the surface cannot be controlled, that is the nature of the pattern and particle size distribution in the pattern are not possible to determine before the production.

The object of the present invention is therefore to provide a device and method for producing concrete paving blocks with a patterned surface, which overcomes drawbacks of the solutions according to the prior art, and makes it possible to manufacture pavers provided even by a surface pattern resembling natural rocks, in particular granite or diorite or other planned surfaces with at most the same production cycle time as the production of pavers without surface pattern has, and the nature of pattern and particle distribution can be well designed prior to manufacture.

Above objectives can be achieved by providing an apparatus according to the invention for producing paving blocks having ornamented surface, consisting of a starting table, and a filling carriage movable along a guide rail towards and above a forming mould comprising at least one mould cavity and connected to the starting table is arranged; and in an interior space of the filling carriage a first chamber for receiving base material and at least one second chamber for receiving ornamenting material are formed and separated by a septum, and a feeding device for dispensing a mixture of ornamenting material is arranged in said second chamber, and the feeding device is formed by a metering plate provided with holes and a metering member fitted to and movable along the metering plate, and further provided by an actuator for moving the metering member.

Said feeding device is formed by a metering plate of cylindrical form and a metering member rotatable around its shaft and provided blades fitting with the inner surface of the metering plate; and said actuator for moving the metering member includes said shaft.

Said feeding device is formed by a metering plate of planar form and a comb-like metering member fitting with the metering plate and provided with openings; and said actuator for moving the metering member includes an actuator rod.

Said feeding device is formed by a metering plate of planar form and a metering member fitting with the surface of the metering plate and provided with feed openings; and said actuator for moving the metering member includes an actuator rod.

Said feeding device is formed by a metering plate of cylindrical form and at least one cylindrical metering member placed on the surface of the metering plate; and said actuator for moving the metering member includes a shaft connected to the metering plate.

An electric motor provided by electronic control means is connected to the actuator for moving the metering member.

A cam follower engaging a cam is connected to the actuator for moving the metering member.

The feeding device is arranged in a frame that can be placed into and removed from the second chamber.

To achieve above object a method for producing paving blocks having ornamented surface is also provided, the steps of which are as follows: filling a base material into a mould cavity of a forming mould, making a mixture of ornamenting material of at least a granular material and a binder, the mixture having an average grain size corresponding to the average grain size of the planned ornament to be formed on the tread surface of the paver, and having a tint different from that of the base material, and applying the mixture of ornamenting material into the surface of the base material filled into the cavity, determining experimentally an adequate screen aperture of holes to be created on a metering plate, creating holes having experimentally determined screen aperture on the metering plate, applying the mixture of ornamenting material on the metering plate provided by holes having experimentally determined screen aperture, then displacing the metering plate parallelly to the surface of the base material filled in the mould cavity, while moving a metering member on the metering plate, and thereby making the mixture of ornamenting material passed through the holes of the metering plate.

Determining experimentally an adequate screen aperture of holes to be created on a metering plate preferably means forming a row of holes on a smooth surface, each subsequent one of which having increasing screen aperture, wherein the screen aperture of a hole having the smallest screen aperture corresponds to at most the average grain size of the mixture of ornamenting material, and placing a mass of mixture on the flat surface, and then moving the mass by means of a screed over the row of said holes, and making at least a portion of said mass of mixture passed through a hole having the adequate screen aperture.

Arranging the feeding device in an open bottomed second chamber of a filling carriage, and then filling the base material from an open bottomed first chamber of the filling carriage into a mould cavity of a forming mould, so that moving the filling carriage from a starting table over the forming mould, then returning the filling carriage onto the starting table, while moving the metering member on the metering plate.

The metering member is preferably rotated.

The metering member is moved in a plane parallel to the metering plate.

The metering member is moved intermittently.

Arranging the holes of the metering plate in a regular pattern.

Arranging the holes of the metering plate in a pattern resembling a polished surface of natural rocks.

Forming a color difference between the base material and said mass of mixture by adding a coloring agent to the mass of mixture.

Applying concrete mortar as the base material and colored concrete mortar as the mixture of ornamenting material.

The invention is illustrated hereinafter with reference to the accompanying drawings and preferred embodiments of the present invention will be described in details. In the drawings:

FIG. 1 shows a schematic representation of the apparatus according to the invention, FIG. 2 shows enlarged view of a first preferred embodiment of dispensing device of the apparatus according to the present invention as shown in detail F of FIG. 1, FIG. 3 depicts a cross-sectional view of the dispensing plate and pairs of dispensing element of the dispensing apparatus shown in FIG. 2, FIG. 4 shows a preferable bore pattern to be formed on the dispensing plate, FIGS. 5, 5a and 5b shows a second preferred embodiment of the dispensing apparatus to be arranged in the second chamber of the apparatus according to the present invention, in FIG. 5c, 5d a preferred arrangement for moving the dispensing member is shown, FIGS. 6 and 6a shows a third preferred embodiment of the dispensing apparatus to be arranged in the second chamber of the apparatus according to the present invention, FIGS. 7 and 7a depicts a fourth preferred embodiment of the dispensing apparatus to be arranged in the second chamber of the apparatus according to the present invention, FIG. 8 illustrates a preferred step of the method according to the invention for experimentally determining the aperture of a bore hole having suitable aperture;

FIG. 10b shows a surface hole pattern formed on the surface of a paver having a hole pattern shown in FIG. 10a.

Figure 1:
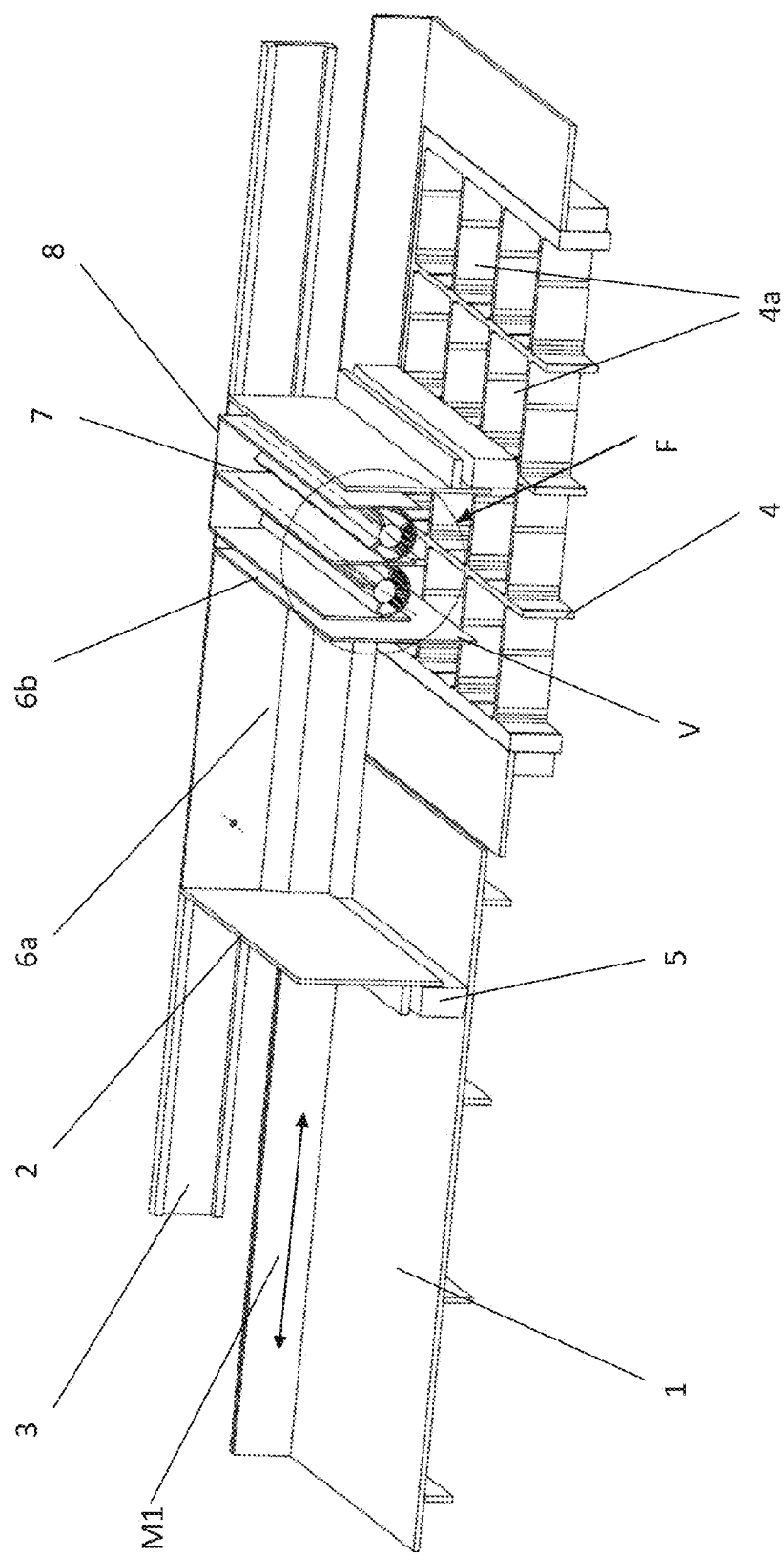

FIG. 1 is a schematic representation of a first preferred embodiment of the apparatus according to the invention for producing paving blocks K or pavers. In this embodiment a filling carriage 2 with open top or having an opening for receiving base material is arranged on a starting table 1, which carriage 2 is to be moved, along a guide rail 3, over a forming mould 4 adjoining the starting table 1 and having at least one, but preferably several mould cavities 4a, and retractable therefrom onto the starting table 1 along the guide rail 3. As the filling carriage 2 is preferably open at its bottom as well, a scraper frame 5 is arranged between the starting table 1 and the carriage 2. The interior of the filling carriage 2 is divided into two chambers 6a, 6b by a partition wall V preferably being perpendicular to the guide rail 3. The chamber 6a is formed to receive base material, e.g. concrete mortar colored or uncolored in itself and suitable for forming the predominant part of the volume of paving blocks K, while chamber 6b receives a feeding device 7 suitable for feeding a mixture MK of ornamenting material, preferably concrete mortar as well, consisting of a particle phase with predetermined grain size distribution and at least one binder material having a plastic state during the production of paving blocks. The colored or uncolored base material can be added into the chamber 6a from e.g. a loading trough or chute located above the starting table 1, not shown but well known by a person skilled in the art, when the filling carriage 2 is on the starting table 1 in a position beneath the trough in its entirety. In this position, the bottom of the filling carriage 2 is closed by the starting table 1. The filling carriage 2 can have more than one chambers 6b separated by partition walls V, although in FIG. 1 only a single chamber 6b is illustrated for clarity.

Figure 3:
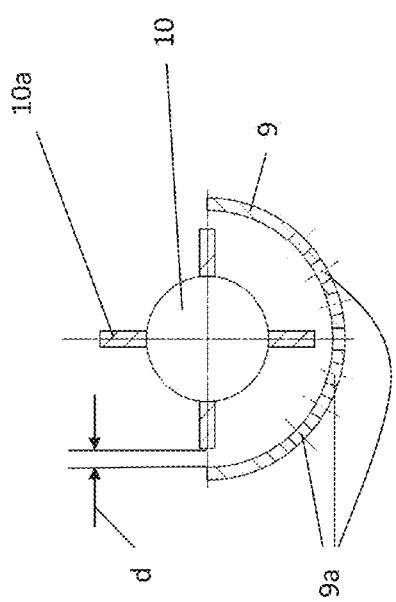

A first preferred embodiment of the feeding device 7 is shown in FIG. 2, which is an enlarged detail F of FIG. 1. Feeding device 7 is removable from chamber 6b along direction N, and a feeding device 7 described later or a similar structure can subsequently be inserted into its place. In this embodiment, the feeding device 7 consists of a perforated metering plate 9 having at least one, but preferably several holes 9a (FIG. 3) and a metering member 10 provided with blades 10a and rotatable around its shaft 10T. Although two metering plates 9 and two metering members 10 can be seen in FIG. 2, the feeding device 7 may be formed from a single pair or more than two pairs of metering plates 9 and members 10 disposed parallelly in the feeding device 7. In the illustrated embodiment, the shafts 10T of metering members 10 are perpendicular to the guide rail 3, but they can also be arranged in parallel position thereto. In the embodiment shown the metering plate 9 has a semicylindrical form, and the shaft 10T of the metering member 10 is arranged in the axis of this semicylinder, so that its blades 10a can be displaced along the inner surface of the metering plate 9, whereas metering members 10 may be rotated around their shafts 10T in any direction. Minimum distance d (FIG. 3) between the inner surface of metering plate 9 and an edge 10b of the blades 10a is preferably less than the least particle size of a mixture MK of ornamenting material, preferably concrete mortar, consisting of a particle phase with predetermined grain size distribution and at least one binder material having a plastic state during the production of paving blocks (K).

Figure 4:
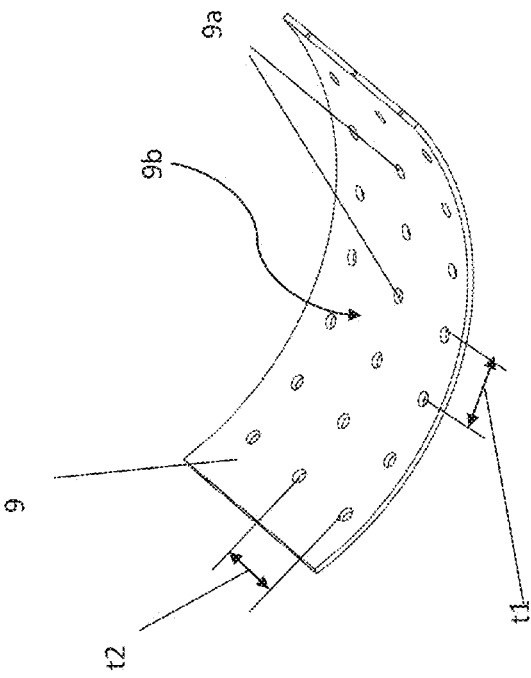

Due to its moisture content concrete mortar is generally viscous, so that its grains stick together by more or less extent. It was found that the colored concrete mortar mixture MK of ornamenting material having particle size of not more than 3 mm forms a vault over hole 9a of any form having about not more than 8 mm, and does not fall through it. To make the particles of a mixture MK of ornamenting material fallen through the holes 9a of a perforated metering plate 9 and thus creating a pattern m (see FIGS. 9a-10b) on the surface of a paving block K the particles of the mixture MK of ornamenting material must be forced through the holes 9a formed on the metering plate 9. This task is performed by the blades 10a of the metering member 10 in this embodiment. The aperture of the holes 9a is designed by a method according to the present invention described later, that for the particles of the mixture MK may pass over the holes 9a, but do not fall through it by their own, due to the viscosity of the mixture MK. Holes 9a formed on metering plate 9 can be arranged in a uniform pattern, that is for example in nodes of a rectangular matrix imagined onto the surface of the metering plate 9, but can also be arranged according to a predetermined pattern. For example, in case of a preferred pattern of holes 9a shown in FIG. 4 areas 9b without holes 9a are arranged between the lines of holes 9 on the metering plate 9, so that distance t1 between holes 9a within a row of holes 9a is equal or different to a distance t2 of rows of holes 9. Thus, it is possible to form distal and proximal, or transverse lines as well, but any regular or irregular pattern may substantially be formed with holes 9a. The holes 9a may be of any shape, i.e., holes 9a other than circular, for example oblong or figurate holes 9 can be created. If one wishes for instance to develop a paving block K having a tread surface resembling the cut section of a large depth igneous granite rock holes 9a must be arranged in a dense and irregular pattern, and in order to achieve a small depth porphyry diorite holes 9a can be arranged on the metering plate 9 in a pattern containing rarely and irregularly or quasi-regularly scattered holes 9a of different shapes and sizes. Arranging the holes 9a in a regular pattern on the metering plate 9, one can form for example plane figures, or either shapes like a flower or even an image according to a photo.

Metering member 10 of the feeding device 7 is movable by an actuator, the actuator consists of the axis 10T in this embodiment, which is driven in this embodiment for example by an electric motor M not shown in details in Figures, but well known by a person skilled in the art, preferably by a servo motor with electronic control means, such as its speed and direction of rotation can be controlled, and it is preferably connected to the axis 10T of the metering member 10. However, the actuator can have a mechanical structure as well. For example, a cogwheel is attached at the end of the shaft 10T of the metering member 10, a ratchet wheel may be interposed, and the cog wheel engages a cam, e.g. a gear rack, arranged parallel to the guide rail 3. The ratchet wheel allows the cogwheel to run freely along the rack, as the filling carriage 2 moves from the starting table 1 to the forming mould 4, and it does not move the metering member 10, while during the movement of the filling carriage 2 in opposite direction, it rotates the metering member 10. If the rack is intermittent, the metering members 10 do not rotate between the sections of the rack. These types of drive are not shown in the figures because they can be designed easily by a person skilled in the art being aware of the apparatus according to the invention.

Figure 5:
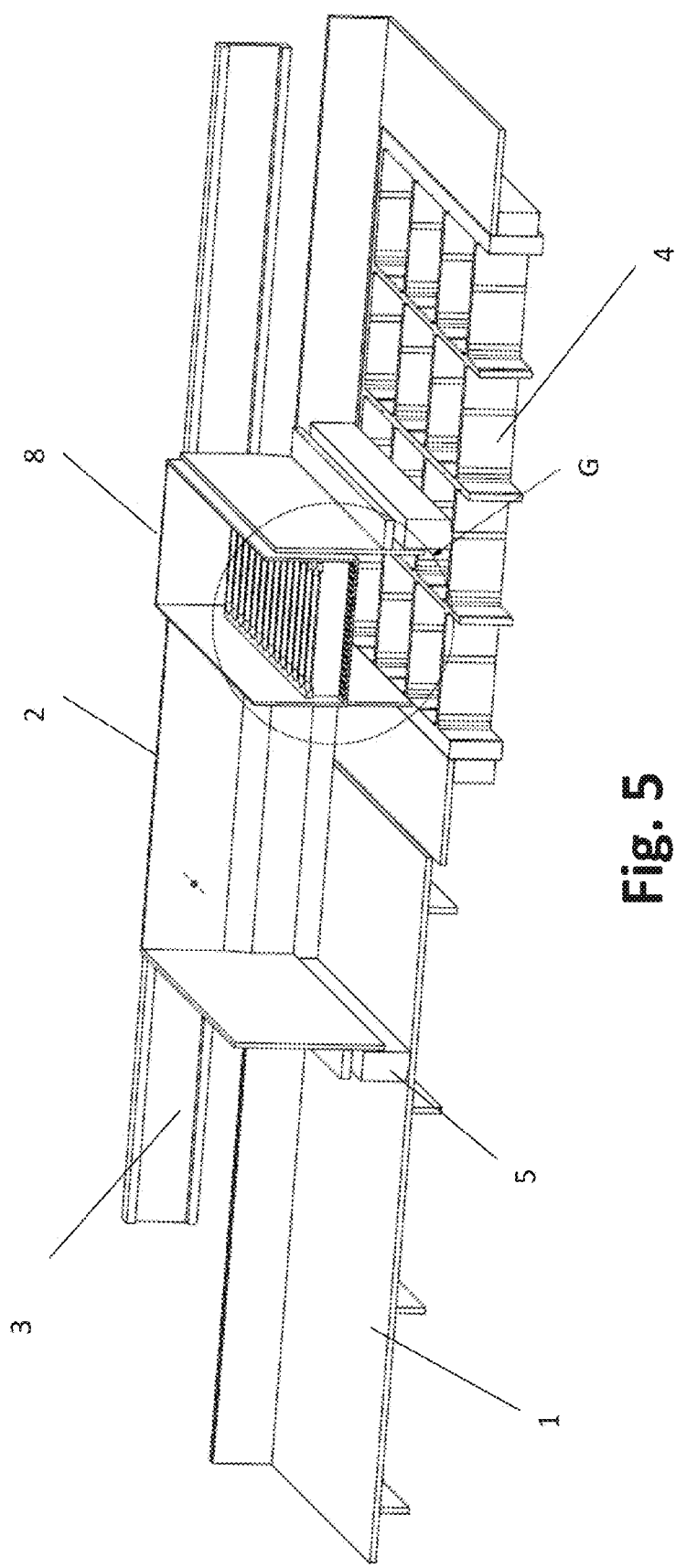
Figure 5B:
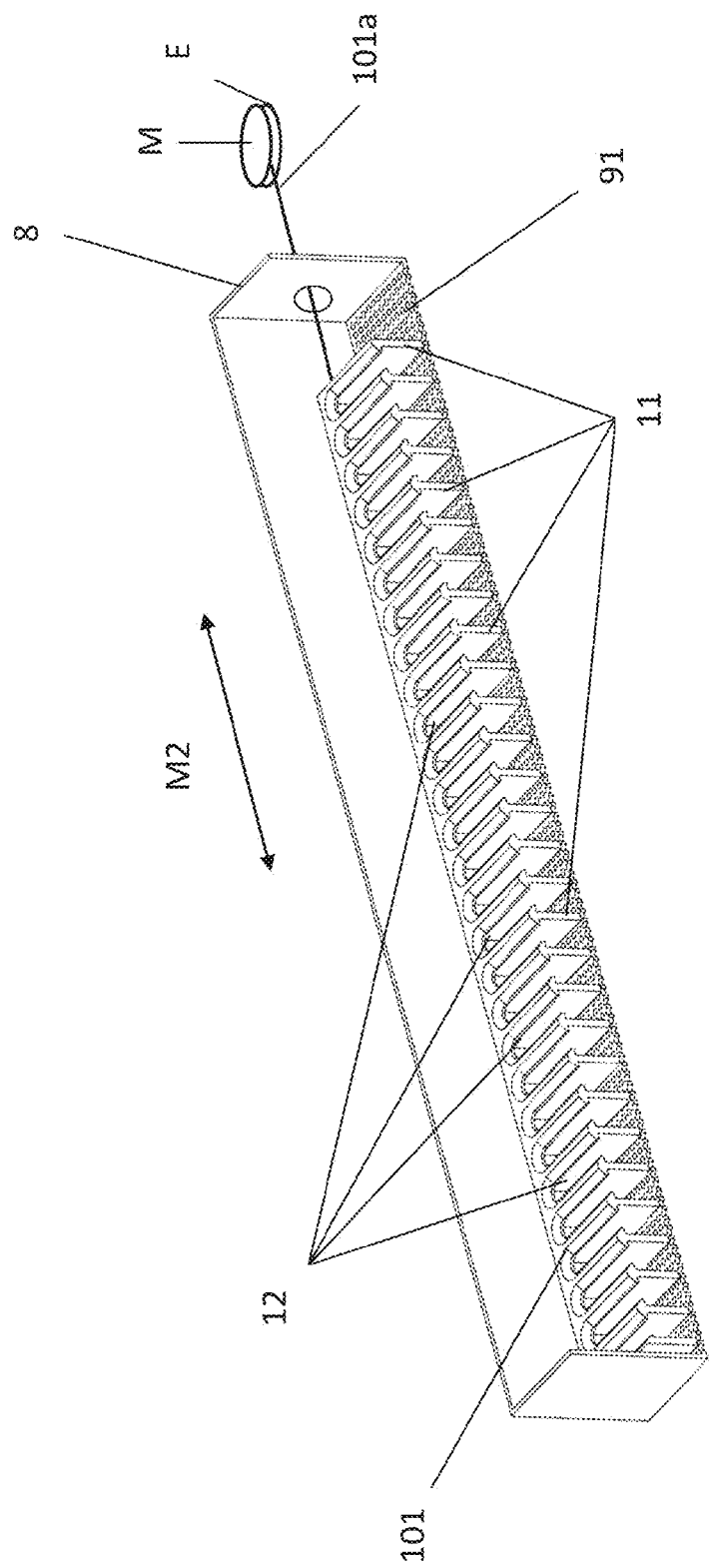

In FIGS. 5, 5a (detail G in FIG. 5) and 5b a second preferred embodiment of the apparatus according to the present invention (FIG. 5), and a further, second embodiment of the feeding device 7 (FIGS. 5a, 5b) to be placed in the chamber 6b are shown, and the feeding device 7 comprises a planar, perforated metering plate 91 and a comb-like metering member 101 lying on the metering plate 91 and both arranged in a frame 8 opened on its top. Metering member 101 is movable back and forth in the direction of arrow M (FIG. 5b) in the metering plate 91. The design of the holes 9a of metering plate 91 as concerns shape and arrangement is similar to that of shown in relation of the first embodiment, and similarly pre-planned as required. The teeth 11 of metering member 101 are preferably perpendicular or nearly perpendicular to the surface of the metering plate 91. Openings 12 are formed between the teeth 11, through which the mixture MK of ornamenting material can pass through the metering member 101 and can leave the feeding device 7 through the holes 9a of the metering disc 91 by free fall.

Moving of metering member 101 of the feeding device 7 in this embodiment can be achieved for example by an electric motor M not shown in Figures, but well known by any person skilled in the art, the revolution of which is preferably electronically controlled, and it is connected by an eccentric to the actuator of the metering member 101, in this case to an actuator rod 101a, which transforms rotation of the motor M into rectilinear reciprocating motion. However, the actuator may be formed as a mechanical assembly as well. For example, a cam follower, e.g. a roller E1, can be connected to the actuator rod 101a instead of an eccentric, rotation axis E1T of which is perpendicular to both a direction M1 of motion of 2 filling carriage and direction M2 of motion of the metering member 101. Roller E1 runs in directions M1, M2 of movement following cam 20 arranged parallel to the guide rail 3 and shown for example in FIG. 5c or 5d, while it is biased toward the cam 20 for example by force of a spring. During movement of the filling carriage 2 along direction M1 starting from the starting table 1 toward the forming mould cam 20 can be movable into a position indicated by dashed line; in this position the roller E1 does not contact the cam 20, so that it does not move the metering member 101. Cam 20 shown in FIG. 5d can also be moved, indeed. However, the actuator assembly may have different forms, creating of which is a simple planning task for a person skilled in the art being aware of the apparatus according to the invention.

Figure 6:
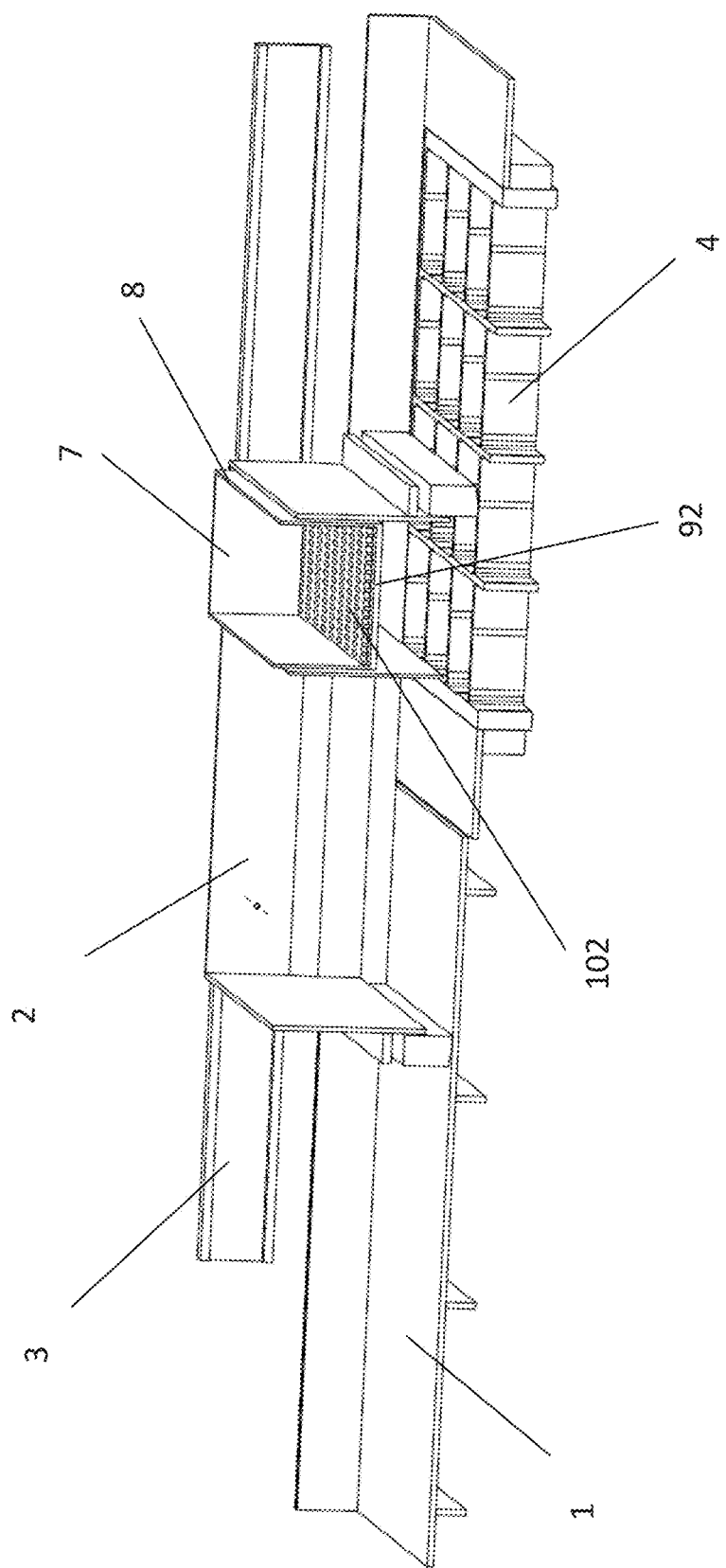
Figure 6A:
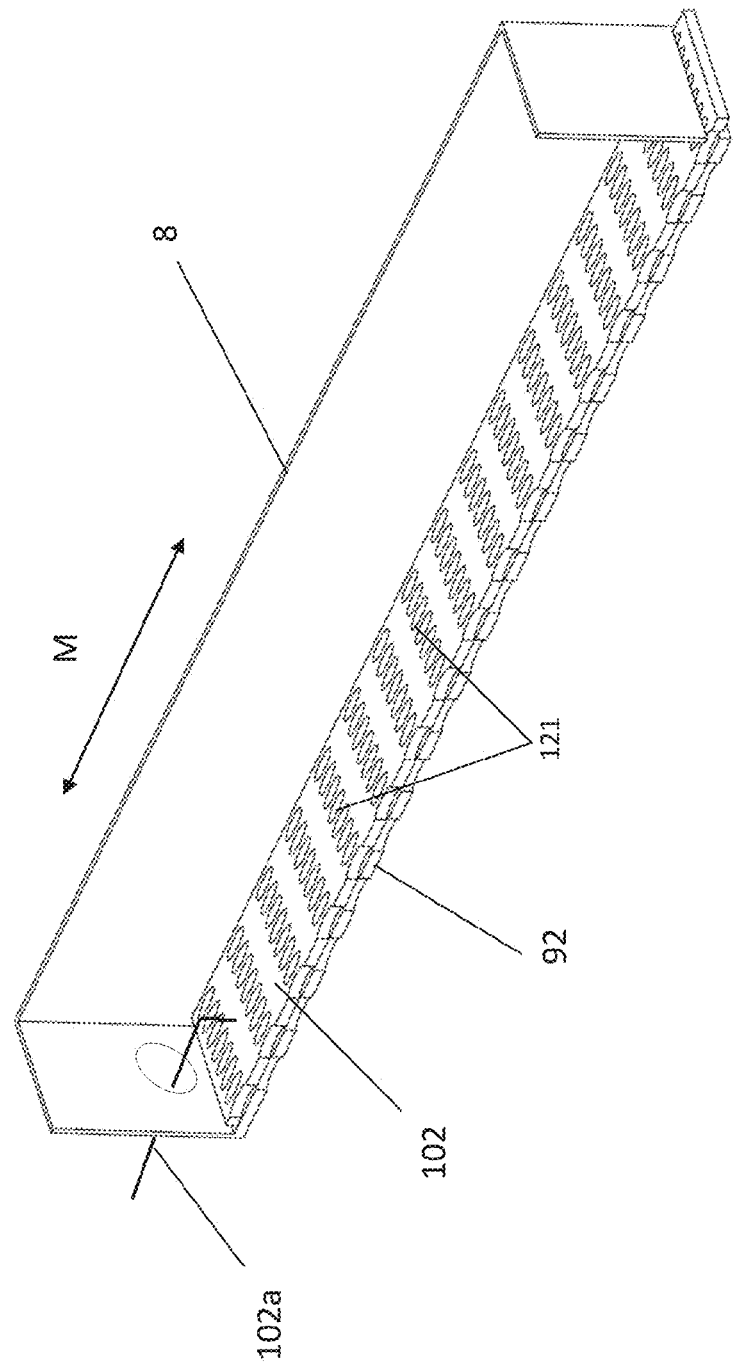

FIGS. 6 and 6a show a third preferred embodiment of the feeding device 7 to be arranged in the chamber 6b of the apparatus according to the present invention, where and the feeding device 7 comprises a planar, perforated metering plate 92 and a perforated metering member 102 formed as a sheet lying on the metering plate 92 and both arranged in a frame 8 opened on its top. The metering member 102 is movable in the direction of arrow M back and forth on the metering plate 92. The design of the holes 9a of metering plate 92 as concerns shape and arrangement is similar to that of shown in relation of the first embodiment, and similarly pre-planned as required. Openings 12 are formed in metering member 102, through which the mixture MK of ornamenting material can pass through the metering member 102 and can leave the feeding device 7 through the holes 9a of the metering plate 92 by free fall.

Moving of metering member 102 of the feeding device 7 can be carried out in a similar manner to the embodiment previously described. However, the actuator assembly may have any different but suitable forms, designing of which is a simple planning task for a person skilled in the art being aware of the apparatus according to the invention.

Figure 7:
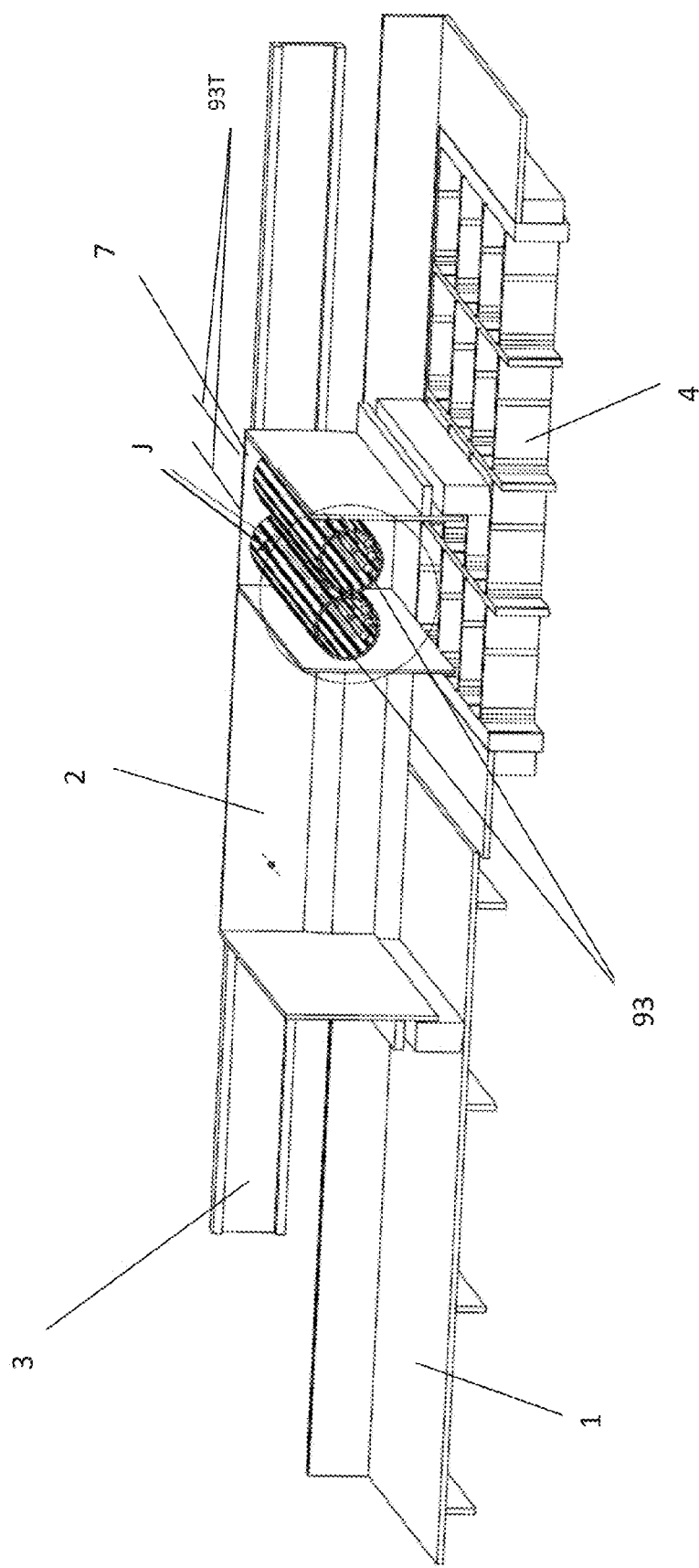
Figure 9B:
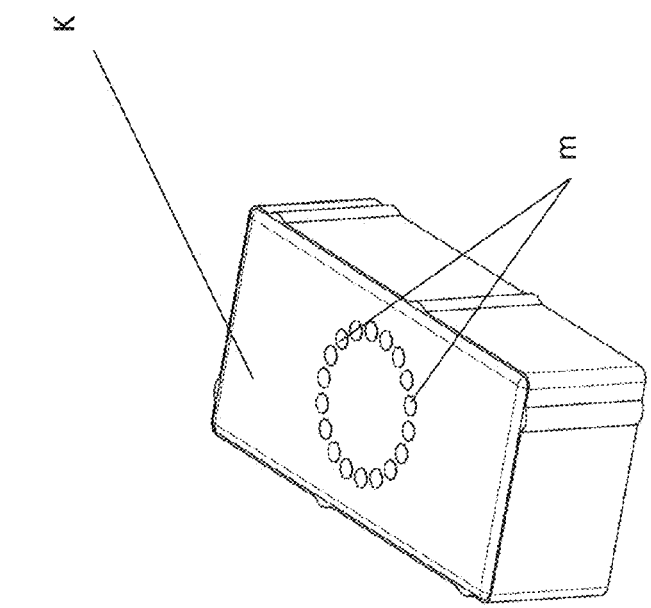
FIG. 9b shows a surface hole pattern formed on the surface of a paver having a hole pattern shown in FIG. 9a, FIG. 10a shows a further hole pattern formed on a dispensing plate.
Figure 9A:
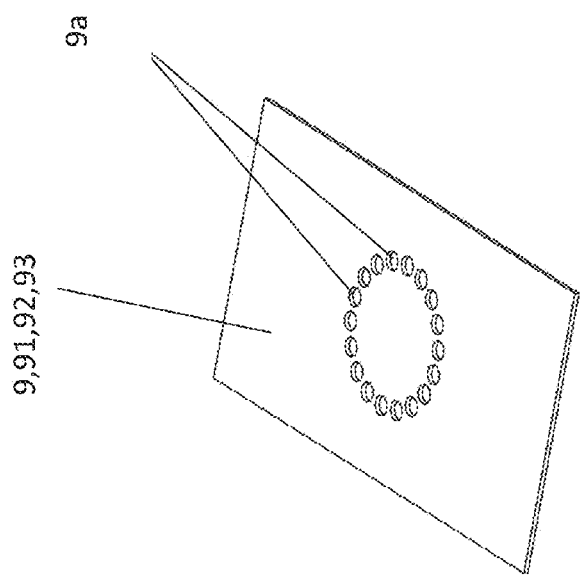
FIG. 9a shows a hole pattern formed on the dispensing plate.

FIGS. 7 and 7a (the latter is a detail J of FIG. 7) show a fourth preferred embodiment of the feeding device 7 to be arranged in the chamber 6b of the apparatus according to the present invention, and this feeding device 7 comprises a perforated metering plate 93 formed as a cylindrical shell, and at least one metering member 103 arranged inside the shell, lying on the metering plate 93 and able to roll freely thereon as well. Moving of metering member 103 of the feeding device 7 in this embodiment can be achieved for example by rotating the cylindrical metering plate 93. The design of the holes 9a of the metering plate 93 as concerns shape and arrangement is similar to that of shown in relation of the first embodiment, and similarly pre-planned as required. Mixture MK of ornamenting material previously filled into the cylindrical inner space of the metering plate 93 can pass through the metering plate 93 by the gravity pressure force of the metering member 103 and can leave the feeding device 7 through the holes 9a of the metering plate 93 by free fall.

Moving of metering member 103 of the feeding device 7 in this embodiment can be achieved for example by an electric motor M, the revolution of which is preferably electronically controlled, and it is connected to an actuator of the metering plate 93, preferably to its axis 93T, with or without a gear drive therebetween. As in the case of the first embodiment, the moving arrangement may have an alternative design as well. For example, a cogwheel is attached at the end of the shaft 93T of the metering plate 93, a ratchet wheel may be interposed, and the cogwheel engages a cam, e.g. a gear rack, arranged parallel to the guide rail 3. The ratchet wheel allows the cogwheel to run freely along the rack, as the filling carriage 2 moves from the starting table 1 to the forming mould 4, and it does not move the metering plate 93, while during the movement of the filling carriage 2 in opposite direction, it rotates the metering plate 93 and hence the metering member 103 as well. If the rack is intermittent, the metering members 103 do not rotate between the sections of the rack, etc. These types of drive are not shown in the figures because they can be designed easily by a person skilled in the art being aware of the apparatus according to the invention. The actuator, that is the shaft 10T, 93T and actuator rod 101a, 102a can be moved either manually, for example by a handwheel locked to the shaft 10T,93T or a handle mounted on the actuator rod 101a, 102a (not shown).

We have also provided a method for manufacturing concrete paving blocks or pavers K having patterned or mottled surface, which may be implemented by the apparatus described herein as well. In a first step according to the most general embodiment of the method a mixture MK of ornamenting material of at least a granular material e.g. gravel and a binder e.g. a mixture of cement and water is provided, the mixture MK having an average grain size corresponding to the average grain size of the planned ornament m to be formed on the tread surface of the paver K, and having a tint different from that of a base material. The different colors of the base material to that of the mixture MK can be achieved by adding a colorant to the base material and/or the mixture MK, but a differing tint can be obtained by using granular material with particles of different colors, for example using colored gravel as well. Then an adequate screen aperture X1 of holes 9a to be created on a metering plate 9,91,92,93 is to be determined experimentally, through which the particles of the mixture MK can be forced entirely through and to fall from the holes 9a by gravity. Then or before, the base material is filled into a mould cavity 4a of a forming mould 4, and then a mixture MK of ornamenting material is applied onto the surface of the material in the mould cavity of the forming mould 4, in such a way that the mixture MK of ornamenting material is fed on the metering plate 9,91,92,93 provided by holes 9a having experimentally determined screen aperture X1. In a further step the metering plate 9,91,92,93 is displaced in a direction M1, preferably toward starting table 1, parallelly to the surface of the base material filled in the mould cavity 4a, while moving a metering member 10,101,102,103 on the metering plate 9,91,92,93 fitted thereto, and thereby the mixture MK is forced through the holes 9a of the metering plate 9,91,92,93, which then drop off by free fall onto the surface of the concrete mortar or base material filled intro the cavity 4a. Subsequently, the concrete mortar is preferably compacted by vibration and using pressure.

The adequate screen aperture X1 of holes 9a to be created on a metering plate 9,91,92,93 can be determined experimentally, in a way as shown in FIG. 8, that is a row of holes 9a are created on a relatively smooth surface R e.g. on a metal plate, each subsequent one of which having increasing screen aperture X, and the screen aperture X of a hole 9a having the smallest screen aperture X corresponds to at most the average grain size of the mixture MK of ornamenting material. Then placing a body of mass of mixture MK onto the flat surface R of the metal plate it is moved in a direction P by means of e.g. a screed S over the row of the holes 9a as shown in FIG. 8, at least until the particles of the mixture MK can be forced in its full size through a hole 9a, and passing through this hole 9a the particles drop off from the hole 9a having therefore the adequate screen aperture X1. Then holes 9a having at least the adequate screen aperture X1 are formed in a desired pattern on a plate in order to create a metering plate 9,91,92,93. The adequate screen aperture X1 of the hole 9a can be determined the more accurately, the smaller the difference of screen apertures X between the subsequent holes on the surface R is selected.

The method according to the invention preferably comprises the step of arranging the feeding device 7 in the open bottomed second 6b chamber of the filling carriage 2, and then the mould cavity 4a of the forming mould 4 is filled with the base material e.g. concrete mortar contained in the open bottomed first chamber 6a of the filling carriage 2, so that the filling carriage 2 is slid over the forming mould 4, and then moved backward toward the starting table 1 while the metering member 10,101,102,103 is displaced on the metering plate 9,91,92,93, either rotating it intermittently or continuously or a planar metering member 101,102 is moved on a planar metering plate 91,92 intermittently or continuously in a plan parallelly arranged thereto. As a consequence, particles of the mixture MK of ornamenting material pass through holes 9a of the metering plate 9 and fall onto the surface of the concrete mortar until the metering member 10,101,102,103 is moving. If the filling carriage turns onto the starting table 1, the chamber 6a can be uploaded again with concrete mortar, and the chamber 6b with mixture MK, if it is run out, and above operation can be carried out again after compaction and evacuation of the mold 4.

In the case when the metering member 101,102 is moved intermittently in a direction M2, or a metering member 10,103 is rotated intermittently, that is breaks are inserted into the movement of the metering members 10,101,102,103 an alternation of areas having and not having a layer of ornamental material can be achieved on the surface of the concrete mortar. The density of a surface pattern along the direction M1 of movement can be altered as well, if the charging carriage 2 moves intermittently in the direction M1 while metering members 10,101,102,103 is moving. If the holes 9a of the metering plate 9,91,92,93 are arranged in a regular pattern, a pattern resembling thereto is created on the surface of the concrete mortar. For example, by means of a pattern formed by the holes 9a arranged on the metering plate 9,91,92,93 shown in FIG. 9a. a pattern m shown in FIG. 9b. is created on the surface of a paving block K, if the metering member 10,101,102,103 is displaced on the metering plate 9,91,92,93 in order to force the particles of the mixture MK through its holes 9a to be fallen down, while the charging carriage 2 containing a feeding device 7 provided by that metering plate 9,91,92,93 is moving over the mould cavity 4a of the mold 4 filled with e.g. concrete mortar in direction M1 towards the starting table 1. A similar pattern m can be created on the surface of the paving block K by moving the metering member 10,101,102,103 above the next mould cavity 4a of the mould 4.

Figure 10B:
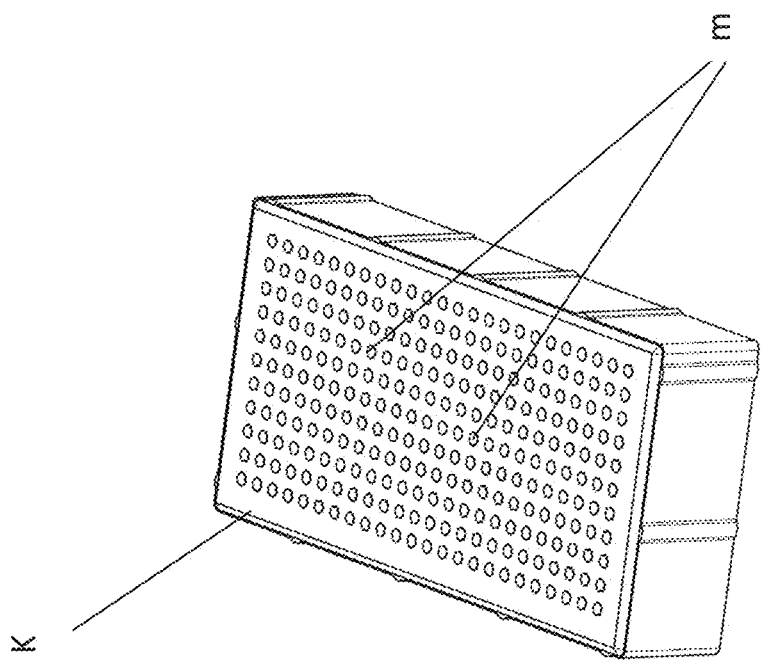
Figure 10A:
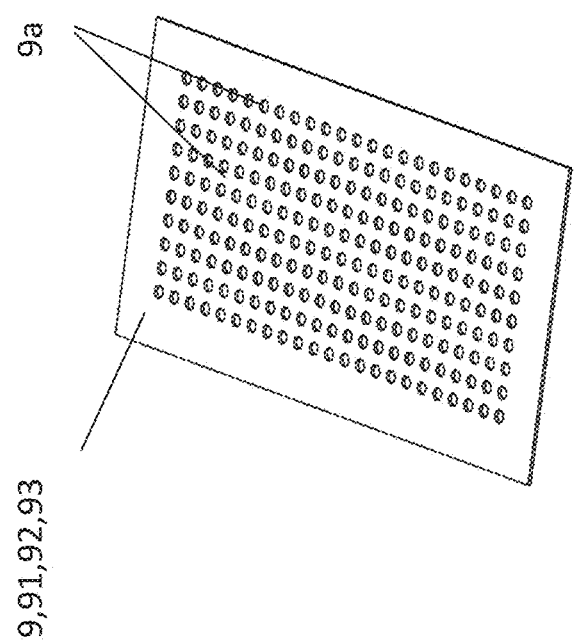

By means of a pattern formed by the holes 9a arranged on the metering plate 9,91,92,93 shown in FIG. 10a. a pattern m shown in FIG. 10b. is created on the surface of a paving block K, if the metering member 10,101,102,103 is displaced on the metering plate 9,91,92,93 in order to force the particles of the mixture MK through its holes 9a to be fallen down, while the charging carriage 2 containing a feeding device 7 provided by that metering plate 9,91,92,93 is moving over the mould cavity 4a of the mold 4 filled with e.g. concrete mortar in direction M1 towards the starting table 1. A similar pattern m can be created on the surface of the paving block K by moving the metering member 10,101, 102,103 above the next mould cavity 4a of the mould 4. Arranged the holes 9 in a regular pattern on the metering plate 9,91,92,93 patterns m according to plane figures, flowers and even images based on photos can be created.

If one wishes to develop a paving block K having a surface resembling the polished surface of natural rocks, for example diorite or granite, the 9a holes can be arranged either in a dense and irregular pattern on the metering plate 9,91,92,93 for granite, or in order to achieve a tread surface pattern m like small depth porphyry diorite a pattern formed by holes 9a with different shapes and sizes arranged in a less dense and irregular way can be formed on the metering plate 9,91,92,93. Density of the pattern m can be controlled either by the number of holes 9a per unit area of the metering plate 9,91,92,93 or the speed of movement done by the charging carriage 2 towards the starting table 1 over the mould cavity 4a of the mould 4 filled with e.g. cement mortar. Therefore, paver blocks K can also be produced by the method according to the present invention, the tread surface of which bears a resemblance to the polished surface of natural rocks, for example diorite or granite, especially if a colored concrete mortar mixture MK of ornamenting material is used for the method according to the invention.

Production cycle time of a mottled paving block K produced by the method according to the invention is not longer than that of a paver produced without surface treating, since applying the mixture MK of ornamenting material occurs during the absolutely necessary movement of charging carriage 2 towards the starting table 1, thus the quantity of paving blocks K manufactured over a given period does not decreases in comparison with the conventional, solid colored or marled pavers.

The advantage of the method and apparatus according to the invention for producing mottled paving blocks K preferably made of concrete mortar in comparison with the prior art solutions is that the production cycle time of a mottled paving block K produced by the method and apparatus according to the invention is not longer than that of a paver produced without surface treating, while makes it possible to manufacture paver blocks K provided even by a surface pattern resembling natural rocks, in particular granite, diorite or other planned surfaces, and the nature and density of the pattern m and particle distribution can be designed prior to manufacture. Though, the method and apparatus according to the invention is designed for producing concrete paving blocks K, but is applicable for any base material and mixture MK of ornamenting material having physical properties similar to those of concrete mortar.

The invention claimed is:

1. A method for producing paving blocks (K) having ornamented (m) surface, comprising the steps of:
    filling a base material into a mold cavity (4a) of a forming mold (4),
    making a mixture (MK) of ornamenting material of at least a granular material and a binder, the mixture (MK) having an average grain size corresponding to the average grain size of the planned ornament (m) to be formed on the tread surface of the paver (K), and having a tint different from that of the base material, and
    applying the mixture (MK) of ornamenting material into the surface of the base material filled into the mold cavity (4a),
    determining experimentally an adequate screen aperture (X1) of holes (9a) to be created on a metering plate (9,91,92,93),
    creating holes (9a) having the experimentally determined screen aperture (X1) on the metering plate (9,91,92,93),
    applying the mixture (MK) of ornamenting material on the metering plate (9,91,92,93) provided by holes (9a) having the experimentally determined screen aperture (X1), then
    displacing the metering plate (9,91,92,93) parallel to the surface of the base material filled in the mold cavity (4a), while
    moving a metering member (10,101,102,103) on the metering plate (9,91,92,93), and thereby
    making the mixture (MK) of ornamenting material passed through the holes (9a) of the metering plate (9,91,92,93).

2. The method according to claim 1, characterized in that determining experimentally the adequate screen aperture (X1) of holes (9a) to be created on a metering plate (9,91,92,93) in such a way, that
    forming a row of holes (9a) each subsequent one of which having increasing screen aperture (X) on a smooth surface (R), wherein the screen aperture (X) of a hole having the smallest screen aperture (X) corresponds to at most the average grain size of the mixture (MK) of ornamenting material, and
    placing a mass of mixture (MK) on the flat surface (R), and then
    moving the mass by means of a screed (S) over the row of the holes (9a), and
    making at least a particle of the mass of mixture (MK) passed through and dropping off a hole (9a) having therefore the adequate screen aperture (X1).

3. Method according to claim 2, characterized in that arranging a feeding device (7) in an open bottomed second chamber (6b) of a filling carriage (2), and then
    filling the base material from an open bottomed first chamber (6a) of the filling carriage (2) into a mold cavity (4a) of a forming mold (4), so that moving the filling carriage (2) from a starting table (1) over the forming mold (4), then
    returning the filling carriage (2) onto the starting table (1), while
    moving the metering member (10,101,102,103) on the metering plate (9,91,92,93).

4. The method according to claim 3, characterized in that the metering member (10, 103) is rotated.

5. The method according to claim 3, characterized in that the metering member (101,102) is moved in a plane parallel to the metering plate (91,92).

6. The method according to any of claim 3, characterized in that the metering member (10,101,102,103) is moved intermittently.

7. The method according to claim 4, characterized in that arranging the holes (9a) of the metering plate (9,91,92,93) in a regular pattern (m).

8. The method according to claim 5, characterized in that arranging the holes (9a) of the metering plate (9,91,92,93) in a pattern (m) resembling a polished surface of natural rocks.

9. The method according to claim 6, characterized in that forming a color difference between the base material and the mass of mixture (MK) by adding a coloring agent to the mass of mixture (MK).

10. The method according to 7, characterized in that applying concrete mortar as the base material and colored concrete mortar as the mixture (MK) of ornamenting material.

* * * * *